United States Patent [19]
Rouse, Jr.

[11] Patent Number: 5,141,463
[45] Date of Patent: Aug. 25, 1992

[54] METHOD AND APPARATUS FOR INTERNALLY SEALING AND SCULPTURING ELASTIC MEMBRANE EXPANDABLE CONTAINERS

[76] Inventor: Graham M. Rouse, Jr., 2442 Wheat St., Columbia, S.C. 29205

[21] Appl. No.: 675,562

[22] Filed: Mar. 26, 1991

[51] Int. Cl.$^5$ .................... A63H 27/10; B60C 29/00
[52] U.S. Cl. ...................... 446/221; 446/222; 446/219; 137/843; 137/223
[58] Field of Search ............. 446/222, 224, 220, 221, 446/225, 219, 226; 137/843, 852, 223; 434/81, 82; 428/9, 12; 244/31, 33

[56] References Cited

U.S. PATENT DOCUMENTS

| | | | |
|---|---|---|---|
| 1,211,369 | 1/1917 | Miller | 446/222 |
| 4,693,696 | 9/1987 | Buck | 446/224 |
| 4,701,148 | 10/1987 | Cotey | 446/224 |
| 4,924,919 | 5/1990 | Oyler | 446/220 X |
| 4,997,403 | 3/1991 | Akman | 446/220 |

*Primary Examiner*—Mickey Yu
*Attorney, Agent, or Firm*—Dority & Manning

[57] ABSTRACT

Apparatus and method for internally sealing and sculpturing an elastic membrane expandable container is provided. One end of a generally hollow tubular insert extends into the container and stretches the elastic membrane of the container from the inside so that such end is sealed by the elastic force of the membrane. Another end of the insert extends out of the container with the container sealed therearound. The container may be pressurized by forcing materials such as fluids into the insert outward end and through the hollow insert so as to cause the elastic membrane to unseat from the sealed end thereof, thereby inflating the membrane. Once the pressure source is removed from the insert outward end, the elastic force of the membrane will cause it to contract and reseat against the tubular insert, thereby resealing it. Selection of the shape of the hollow tubular insert can in effect internally sculpture the container in a desired manner, while the hollowness of the insert in combination with its exposed outward end further provides access to the interior of the inflated container without breaking the seal thereof. Various other objects such as activated chemical lights or temperature regulation devices may thereby be selectively introduced to the container interior.

46 Claims, 6 Drawing Sheets

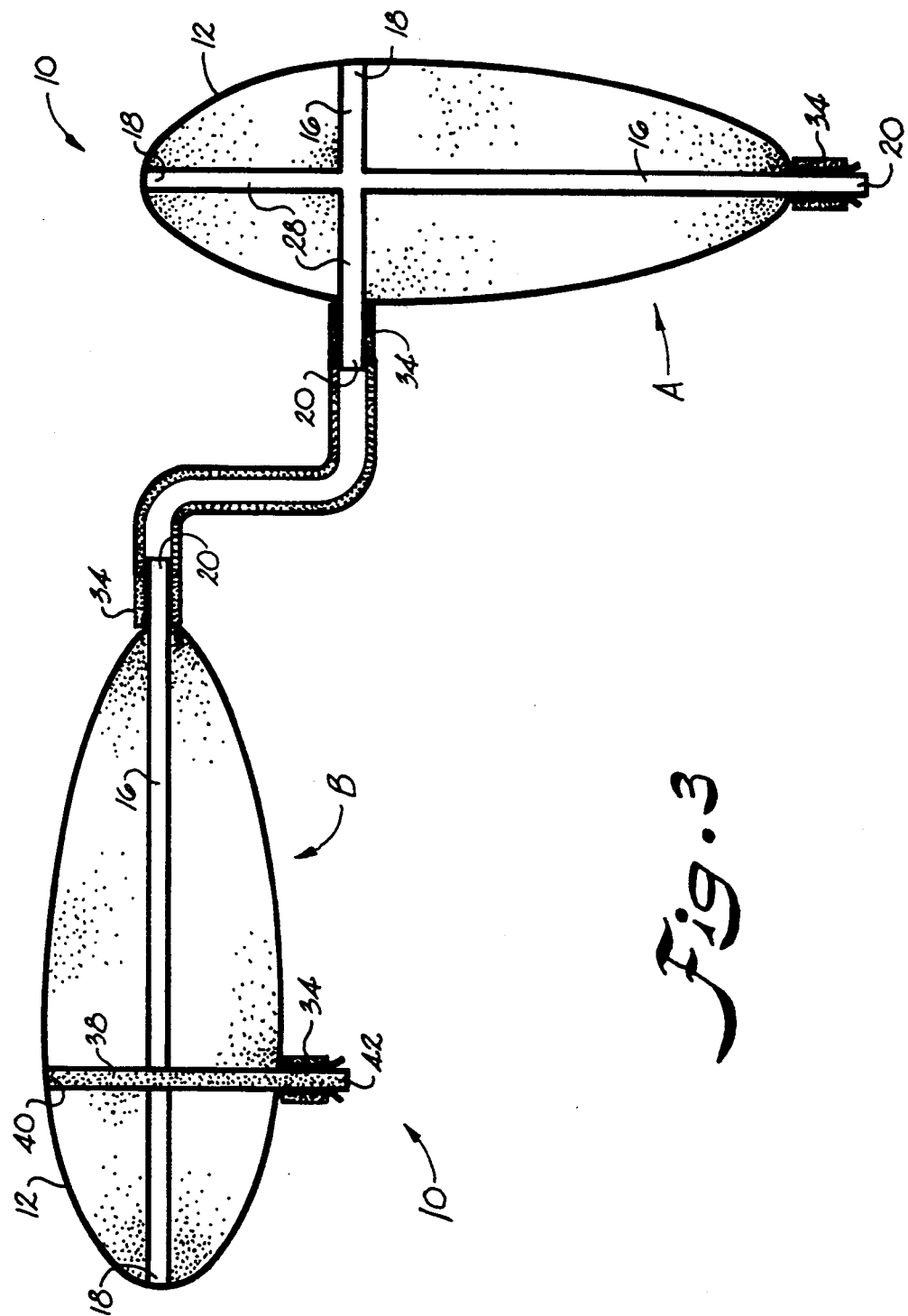

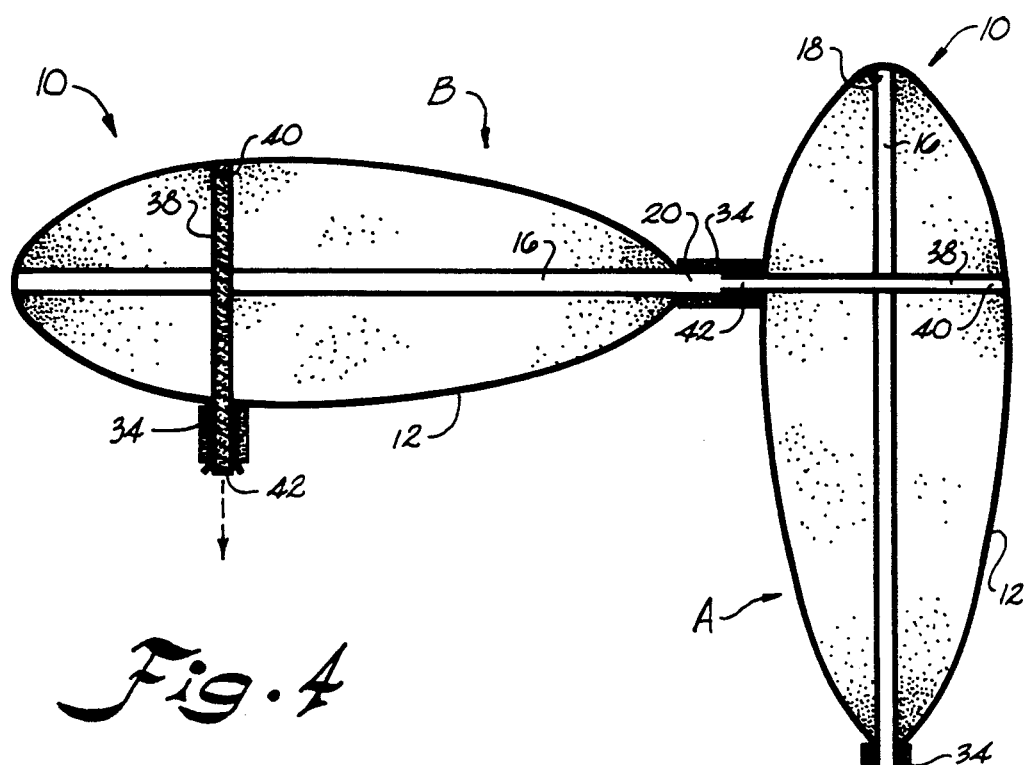
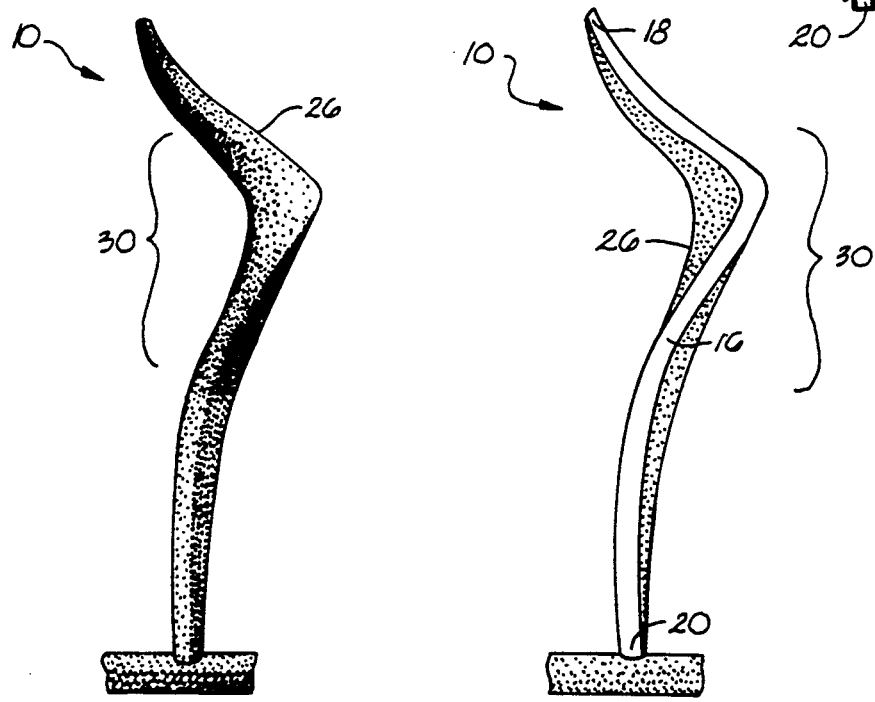

METHOD AND APPARATUS FOR INTERNALLY SEALING AND SCULPTURING ELASTIC MEMBRANE EXPANDABLE CONTAINERS

BACKGROUND AND SUMMARY OF THE INVENTION

The present invention generally concerns improved method and corresponding apparatus for internally sealing an elastic membrane expandable container, and more particularly concerns self-sealing and desirably sculptured containers such as a balloon.

Elastic membrane inflatable containers are commonly known. For example, balloons, inner tubes, elastic containment devices, and the like are known and used by those in the art as well as the general public. Various mechanisms for sealing such containers are also known, but generally none which employ the concepts and obtain the advantages of the present invention.

Stop cocks, plugs, staples, knots, heat seals, and any other number of devices and methods are currently used for sealing inflatable containers. Additionally, reverse-seating pressure actuated devices, such as an inner tube valve stem, are known which use the actual pressure within the container as the sealing force. However, such methods and devices in general completely seal the interior volume of the container to the outside. With such prior art devices, once the container is sealed it is generally impossible to access the interior volume of the container without breaking the seal thereof.

The present invention in general provides apparatus and method which seal the container while beneficially providing access to the interior volume thereof. This invention accomplishes such present purpose by using the interior face of the elastic membrane and the elastic forces generated thereby to seal one end of a generally hollow element inserted into the container, with the container sealed around this element generally at the other end thereof. Advantageously, by further insertions into the tube exposed end, any number of devices are provided access to the interior volume of the already inflated container without unsealing and deflating the container.

In general, there are also various methods and devices known in the art for shaping and forming inflatable containers into some desired configuration. For example, balloons are often currently shaped by tieing or knotting balloons together or by configuring them around some external framework. In another (generally more expensive) approach, the balloon itself may be fabricated into the final desired shape. The present applicant has also sculptured balloons by inserting relatively rigid components, such as wire or plastic rods, into the balloons to deform them internally into a desired configuration. However, until the present invention, none of the known sculpturing methods have utilized the sculpturing device to also seal the container nor to provide access to the internal volume of the inflated container.

The present invention recognizes and addresses various of the foregoing problems, and others, concerning elastic container operations. Accordingly, broadly speaking, a principal object of this invention is improved method and apparatus relating to elastic containers.

Another object of the present invention is to provide an apparatus and corresponding method for sealing an elastic membrane expandable container capable of maintaining substances therein in a pressurized state.

A more specific present object is to provide apparatus and methodology for internally sealing an elastic membrane expandable container utilizing the elastic force of the membrane as part of the actual sealing mechanism.

Yet another object of the present invention is to provide sealing apparatus and method for elastic membrane expandable containers that allow objects, such as a light source or pressure/temperature control device, to be inserted into the pressurized container without breaking the seal on the container.

Still another object of this invention is to provide a sealing apparatus for an elastic membrane expandable container capable of being pressurized with any combination of gas, liquid, or fine particulate matter exhibiting fluid mass properties.

Yet another object of the present invention is to provide a sealing apparatus and method for internally sealing balloons. More particularly, it is an object to provide method and apparatus especially useful in the art of fabricating aesthetic balloon configurations.

And still another object of this invention is to provide a sealing apparatus for elastic membrane expandable containers that allows a plurality of the containers to be connected in series and/or parallel combination and where the combination of containers can be pressurized generally simultaneously or sequentially.

Another object of the present invention is to provide an internal sealing apparatus and method for elastic membrane expandable containers that further allows the container to be internally shaped and sculptured into any desired form. Present attainment of such object is particularly useful in the context of the aforementioned aesthetic balloon configuration application.

Still another object of this invention is to provide a pressure relief/vent containment device.

A further object of this invention is to provide and internal sealing apparatus for elastic membrane expandable containers further having a pressure relief device preventing the rupturing of the expandable container from an overpressure condition.

And yet another object of the present invention is to provide a sealing apparatus for elastic membrane expandable containers capable of maintaining the substance carried within the container between a desired pressure band.

Still a further object of this invention is to provide of method for internally sealing and sculpturing an elastic membrane expandable container.

Another object of the present invention is to provide a method for internally sealing and sculpturing balloons.

These and other objects, aspects, and features of this invention are more particularly discussed and described in the remainder of the specification. Various modifications and alterations to the features, elements, and constructions disclosed herewith may occur to those of ordinary skill in the art, and are intended to come within the spirit and scope of this invention by virtue of present reference thereto. Such modifications and variations may include, but are not limited to, the substitution of functionally equivalent structures, means, elements, and steps for those expressly disclosed, illustrated, or suggested herewith, as well as the functional or positional interchange of various features or steps disclosed as would be readily apparent to those of ordinary skill in the art.

Still further, it is to be understood that different embodiments, as well as different presently preferred embodiments, of this invention, may include various combinations or configurations of presently disclosed features or steps, or their equivalents (including combinations or configurations of features or steps not expressly shown or stated).

To achieve the objects and in accordance with the purpose of the invention, as embodied and broadly described herein, there is provided an exemplary embodiment of an apparatus for internally sealing elastic membrane pressurizable expandable containers according to the present invention, generally comprising a relatively rigid tubular insert having a sealing end and an inflating end, the insert extending into the expandable container an adequate distance so that the sealing end internally seats against and stretches the elastic membrane at some point within the container so that the elastic force of the stretched elastic membrane seals the sealing end while the inflating end extends from the expandable container. Such apparatus further includes means for sealing the expandable container around the tubular insert generally at a point between the inflating end and the sealing end so that upon connecting the inflating end to an external pressure source, a pressurized substance travels through the tubular element and causes the elastic membrane to unseat from the sealing end such that the pressurized substance enters into and expands the expandable container, and upon disconnecting such external pressure source the elastic force of the membrane reseals the sealing end.

More specifically, the apparatus of this invention allows for the internal sealing of elastic membrane containers, particularly balloons, that are capable of being pressurized with and maintaining substances in a pressurized state. Such substances may include gasses, liquids, or fine particulate material.

In another presently preferred embodiment of this invention, the tubular insert, being hollow, allows for the insertion of any number and type of devices into the interior volume of the container while it is inflated without breaking the seal on the container. For example, a light source such as an activated chemical light may be inserted into the tubular insert for internally illuminating the inflated balloon and creating an alluring and pleasing creation. In another preferred embodiment, temperature and/or pressure control devices may be inserted into the container through the tubular insert, for controlling the temperature and pressure of substances within the inflated container without actually contacting the substance or breaking the seal of the container.

In a further preferred embodiment of the present invention, the sealing apparatus may be utilized as a pressure relief/vent containment device. In instances where it is undesirable to have a venting vessel relieve or vent to atmosphere, the apparatus of the present invention can be connected to the vessel's vent. The substance relieving from the vessel will then be contained and sealed within the expandable container.

In another preferred embodiment, a pressure relief tube may also be included within the expandable container. The relief tube is also sealed by the elastic membrane and defines a relief path for the pressurized substance to escape from the container upon an overpressure condition therein. In a further preferred embodiment, a plurality of these devices are connected in series by having the relief tube, in essence, relieve into another present apparatus. In this manner any number of the apparatuses may be connected and pressurized or inflated sequentially.

In another preferred embodiment of this invention, the tubular insert is preconfigured into some shape or design to internally sculpture the inflated container, in addition to sealing it, into some desired configuration. The shaped tubular insert presses against and deforms the elastic membrane container from the inside.

To further achieve the objects and in accordance with the purpose of the present invention, as embodied and described herein, there is provided corresponding method for sealing an expandable elastic membrane container, particularly such as a balloon. Generally, such exemplary method according to the present invention comprises the steps of inserting into the container a relatively rigid tubular insert having a sealing end and an inflating end so that the sealing end internally seats against and stretches the elastic membrane at some point within said container so that the elastic force of the membrane seals the sealing end, while the inflating end extends from the container; sealing the container to the tubular insert generally at a point between the inflating end and the sealing end; and connecting the inflating end to an external pressure source so that a pressurized substance travels through the tubular insert and causes the elastic membrane to unseat from the sealing end such that the pressurized substance enters into and expands the container. Such method may also further include disconnecting the external pressure source from the inflating end so that the elastic force of the membrane reseals the sealing end.

In another preferred embodiment of this invention, the method further comprises the step of internally sculpturing the expandable container by preconfiguring the tubular insert into some desired design. Hence, when the tubular insert is placed within the expandable container, it presses against and deforms the elastic membrane from the inside resulting in an internally sculptured inflated container.

In another preferred embodiment, the method of this invention further includes the step of inserting a light source and/or temperature and/or pressure control device into the expanded container through the tubular insert.

Still another present exemplary method comprises a method of fabricating an aesthetic balloon creation, comprising the steps of providing a plastic tube with first and second ends, an elastic balloon, and a short section of a tubular fitting; inserting the first end of the tube into the balloon and stretching the balloon over the length of the tube generally to the second end thereof; temporarily securing the stretched balloon at the tube second end; applying the tubular fitting to the tube second end and about the stretched balloon so as to secure and seal the stretched balloon thereat; forcing a fluid (i.e., a liquid or a gas) into the tube second end so as to fill the balloon to a desired amount; and interrupting the flow of forced fluid to the tube second end so that the elastic force of the stretched balloon seals the flow of fluid at the tube first end.

Additional aspects and features of such exemplary embodiments and others are discussed in greater detail below.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which:

FIG. 3 is a side cross-sectional view of a further preferred embodiment of the present invention illustrating exemplary connection of a plurality of apparatuses according to this invention;

FIG. 4 is a side cross-sectional view of a preferred embodiment of the present invention further illustrating pressure relief tube features which may be optionally incorporated therein, and further depicting an optional present feature of the pressure relief tube relieving to another apparatus according to the present invention;

FIG. 5A is a side elevational view of an apparatus according to the present invention resulting in internal sculpturing of a balloon;

FIG. 5B is a side cross-sectional view of the apparatus illustrated in FIG. 5A, revealing the preconfigured tube insert therein in accordance with this invention.

Figure 1:
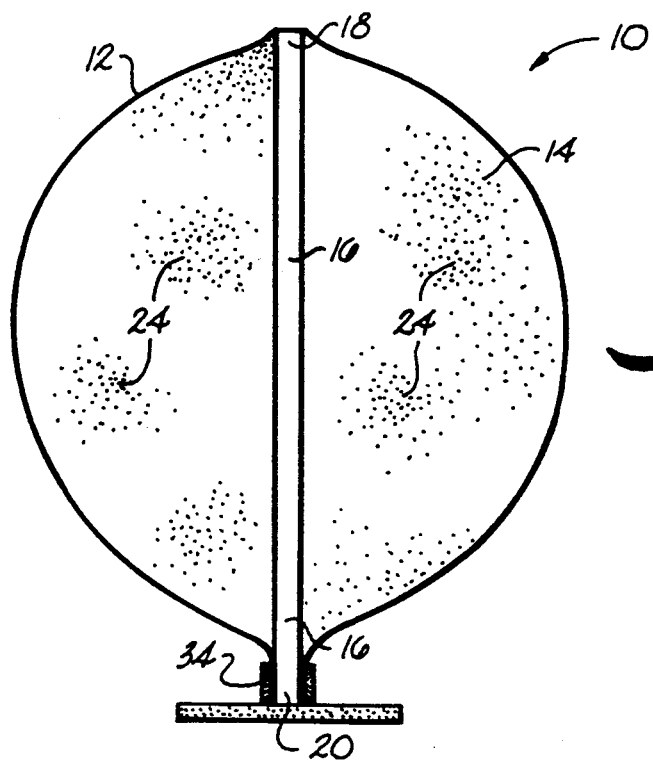
FIG. 1 is a side cross-sectional view of an embodiment of an exemplary apparatus in accordance with the present invention.

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to the present preferred embodiments of the invention, examples of which are illustrated in the accompanying drawings. The following disclosure is for purposes of example only, and is not intended to limit broader aspects of the invention embodied thereby.

The apparatuses and methods of the present invention are particularly suited for the field of balloon art (i.e., aesthetic balloon configuration) but, are not limited thereto. The following description and appended drawings generally refer to balloons and the like for ease of illustration and explanation but, this is not meant as a limitation. For example, the present invention could be used as a pressure containment device for a venting vessel, or as a pressure regulator or similar use. It is within the scope and spirit of the present invention to consider this apparatus and method in all applications of use requiring the sealing of elastic membrane expandable containers.

Figure 2A:
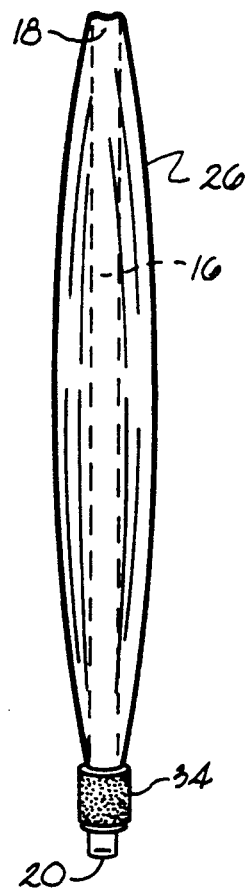
FIG. 2A is a side cross-sectional view of the present invention depicting the apparatus with a balloon in an initial unpressurized state stretched by a tubular insert per present features.
Figure 2B:
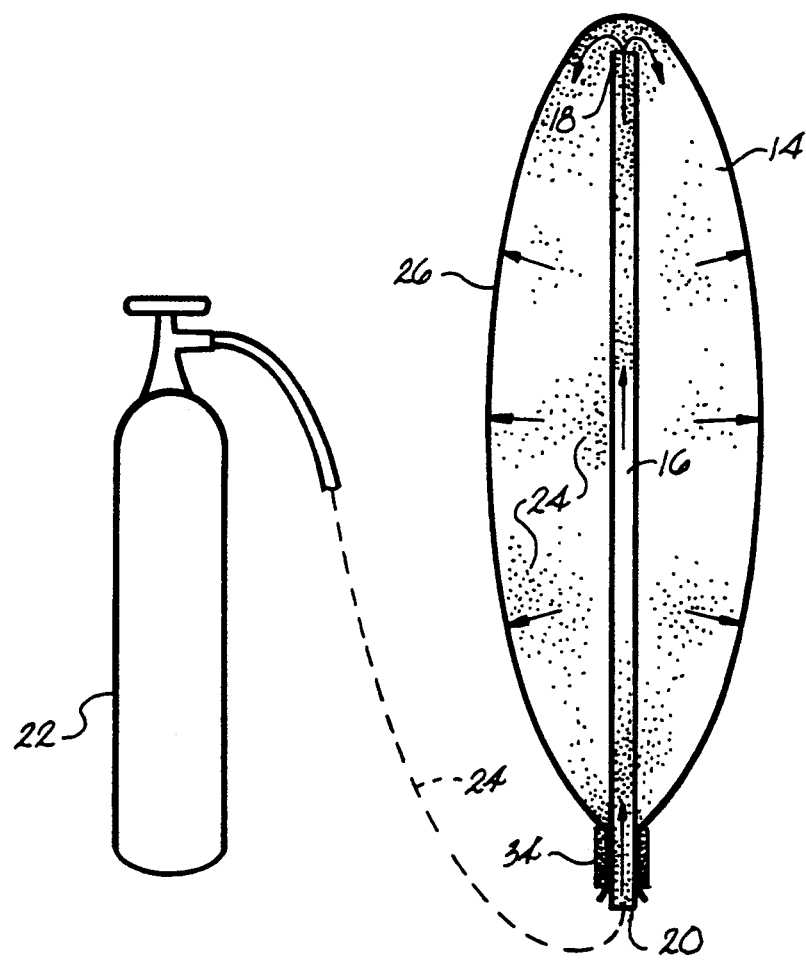
FIG. 2B illustrates the apparatus of FIG. 2 being inflated from an external pressure source, and specifically depicting the balloon being unseated from the tubular insert sealing end so as to allow the balloon to inflate in accordance with this invention.
Figure 2C:
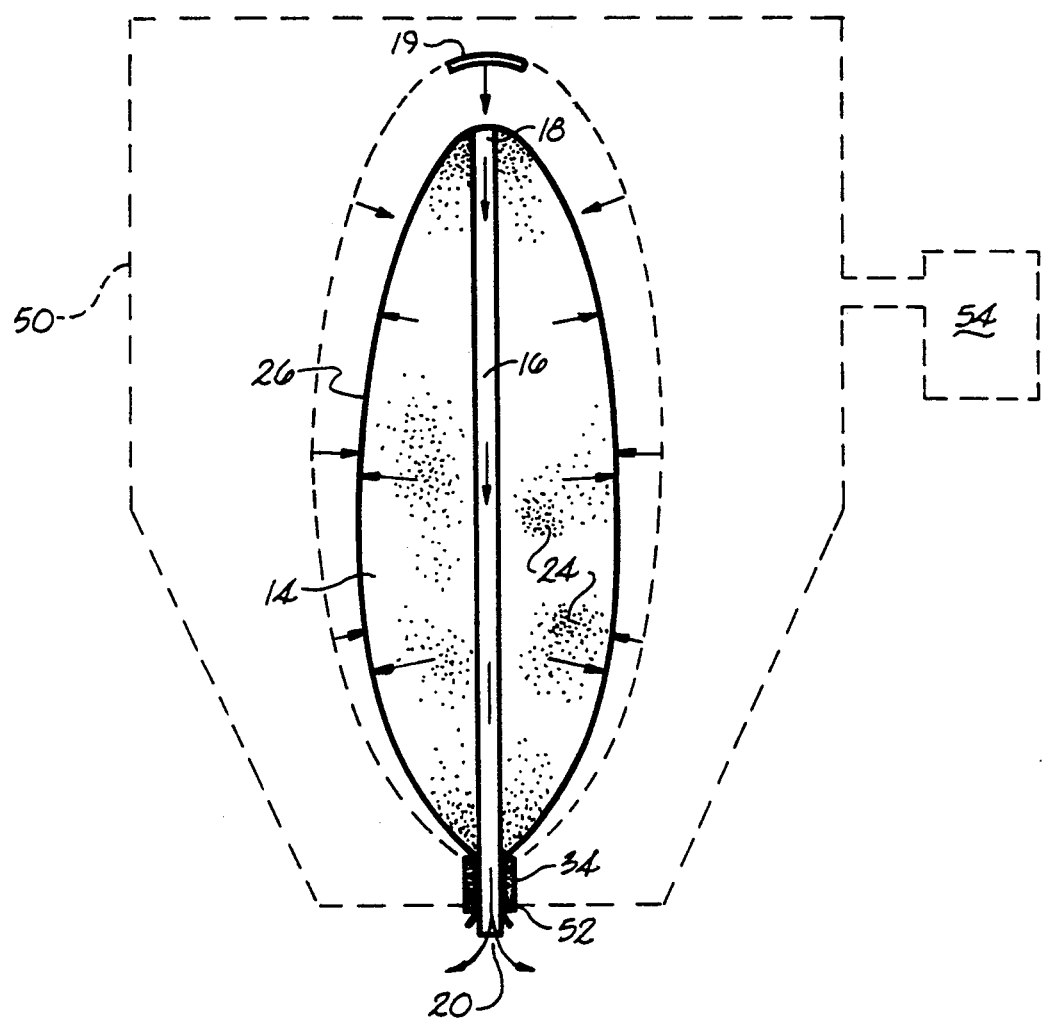
FIG. 2C illustrates the apparatus of FIG. 2B subsequent to being disconnected from the external pressure source, with the dashed outline of the balloon and inwardly pointing arrows depicting the balloon relieving through the tubular insert until the balloon reseats thereon.

Apparatus, generally 10, for internally sealing an expandable container 14 having an elastic membrane 12 is shown in FIG. 1. Container 14 is capable of being pressurized and maintaining substances 24 carried therein in a pressurized state. Substances 24 may be any combination of gas, liquid, or fine particulate matter exhibiting fluid mass properties, such as an extremely fine sand. Apparatus 10 may be used with any type, shape, or size container 14, the only requirement being that container 14 have, as some suitable portion of its containment vessel, an elastic membrane 12. Elastic membrane 12 may be of any known elastic material such as latex, rubber, or like material capable of expanding or stretching under pressure. In one preferred utilization of the present invention as shown in FIGS. 2A, 2B, and 2C, container 14 is a balloon 26.

Although the Figures illustrate container 14 as being completely defined by elastic membrane 12, such is not a limitation of apparatus 10. For example, the majority of container 14 may actually be of a rigid inflexible material with only a small portion being of elastic membrane 12.

Apparatus 10 according to the present invention comprises a relatively rigid tubular insert 16. Insert 16 is preferably formed of some lightweight transparent material such as extruded plastic or the like. Insert 16 is tubular in the sense that it defines a path therein for substance 24 to travel therethrough. For illustrative purposes only, most of the Figures depict insert 16 as being a generally straight pipe-like structure. However, such is not a limitation, nor the presently intended meaning of the terms tube or insert. Insert 16 can be of any general shape or size, for example a bulb shape, and the conduction path it defines can have different dimensions as might be desired or required in different applications. See also, alternate shapes as represented in present FIGS. 5A and 5B discussed below.

Tubular insert 16 has a sealing end 18 and an inflating end 20. Structurally, there need be no difference between sealing end 18 and inflating end 20 wherefore they may be interchangeable. It is generally preferred that sealing end 18 have a smooth contoured edge to prevent its damaging elastic membrane 12. Sealing end 18 is so designated generally because it is the end of insert 16 which seals against elastic membrane 12. Element 19 may comprise a reinforced sealing member carried internally on member 12 to further reduce the potential of damage thereto. Inflating end 20 is so designated because it is the end of insert 16 that is connected to an exemplary external pressure source 22. The operation and relation of the components will be discussed in detail below.

Apparatus 10 of the present invention further comprises means for sealing expandable container 14 around tubular insert 16 generally between ends 18 and 20, and preferably at the point where inflating end 20 of insert 16 extends through container 14. Any known sealing means may be utilized here, such as a heat seal, glue, tape, string, friction fit, etc. In the presently preferred embodiment, as shown in the Figures in general, a collar device 34 slides over inflating end 20 sealing a portion of elastic membrane 12 against tubular insert 16. The seal may be by interference or friction fit or may be assisted by other sealing means, such as glue. When a balloon 26 constitutes container 14, collar device 34 may comprise a short section or piece of vinyl tubing which seals the neck of the balloon against insert 16.

In one preferred embodiment according to the present invention, tubular insert 16 may further comprise a plurality of appendages 28, as shown in FIG. 3. Each appendage or other tube section 28 may have its own sealing end 18 in effect creating branches of tubular insert 16 within container 14, each branch discharging into container 14 and sealing with elastic membrane 12.

In an alternative preferred embodiment, any number of appendages 28 may extend through container 14 with elastic membrane 12 being sealed therearound. Each of such extending through appendages 28 may have its own removable sealing device, such as a cap, plug, or any known device or method for sealing an opening to the outside. Such is a preferred configuration in that it allows each extending through appendage 28 to act as a tubular insert inflating end 20 thereby providing for simultaneous pressurization through any combination of such extending through appendages 28. Such configuration is further preferred in that it allows for any number of apparatuses 10 to be connected in user-selected parallel or series combinations and pressurized simultaneously by connecting an inflating end 20 of one apparatus 10 to an extending through appendage 28, as represented in FIG. 3. There is no limitation on the possible number, shape, or dimensions of appendages 28 nor on the aesthetic or functional combinations of apparatuses 10 which can be created therewith.

In another preferred embodiment of the present invention, as shown for example in FIG. 4, apparatus 10 may further optionally include a pressure relief tube 38. Relief tube 38 may be of the same material as tubular insert 16 and can likewise assume any shape, size, or dimension. Relief tube 38 is preferably nonmovably affixed to tubular insert 16, with the two preferably formed as a single (i.e.. integral) component. There should be some physical separation between the path defined by tubular insert 16 and relief tube 38. In other words, relief tube 38 must define a completely separate and independent path into and out of container 14 for proper operation.

The operation of relief tube 38 will be explained in greater detail below; however, basically, relief tube 38 has pressure end 40 which is sealed by elastic membrane 12 and vent end 42 which is open to the outside, with container 14 being sealed around tube 38 preferably with a collar device 34 at the point where vent end 42 extends through container 14. Upon pressurization of container 14 through insert 16, elastic membrane 12 will expand to the point where it lifts (i.e., unseats) from pressure end 40 of relief tube 38. This allows pressurized substance 24 to then relieve through relief tube 38 reducing the pressure within container 14 to the point where elastic membrane 12 reseats (i.e., reseals) onto relief tube pressure end 40.

With the configuration just described, apparatus 10 according to the present invention can be utilized as a pressure regulating device maintaining pressurized substance 24 within a desired pressure band within container 14. For example, container 14 would be pressurized through tubular insert inflating end 20 causing elastic membrane 12 to unseat from sealing end 18 thereby inflating container 14. The high point of the desired pressure band would be established at the internal pressure causing container 14 to expand to the point elastic membrane 12 unseats from relief tube pressure end 40. The low point of this pressure band would be the pressure at which elastic membrane 12 reseats upon tubular insert sealing end 18.

In one preferred embodiment of this invention, as illustrated in FIG. 4, relief tube vent end 40 is connectable to inflating end 20 of another apparatus 10, to which yet another apparatus 10 might be similarly connected thereby forming a chain or series of such apparatuses 10. In another preferred embodiment of this configuration, pressure relief tube 38 may actually be an integral component of an elongated second tubular insert 16. In other words, relief tube pressure end 40 would also be the tubular insert sealing end 18 of a connected apparatus 10. When apparatuses 10 are mated as just described, it should be apparent and understood to one of ordinary skill in the art that they can be inflated sequentially, with the most upstream (closest to pressure source) one being inflated first, which then relieves to and inflates the second, and so forth.

Figure 6:
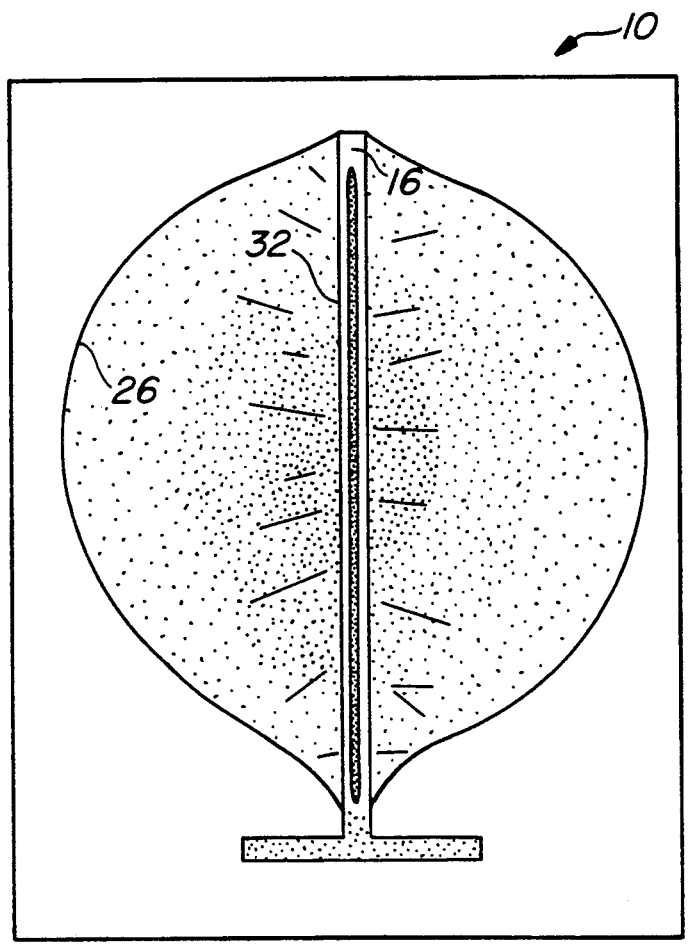
FIG. 6 is a side cross-sectional view of a preferred embodiment of the present invention particularly representing an additional object, such as a light source, carried within the tubular insert (the apparatus is show against a black background to emphasize the internal illuminating effect of the light source).

In another preferred embodiment of this invention, as represented for example in FIG. 6, apparatus 10 may further comprise a light source and/or temperature and/or pressure control device extending into and carried within tubular insert 16. FIG. 6 illustrates specifically an exemplary light source 32 within insert 16, preferably an activated chemical light source. Similarly, a heat strip or cooling strip could be employed in accordance with this invention in place of element 32. Such concept beneficially addresses the broader features and spirit of the present invention in that it allows for access to the interior volume of container 14 even after pressurization and without breaking the seal thereof. For example, container 14 might be pressurized with liquid that must be kept at a certain temperature while under pressure. A temperature control device inserted within insert 16 in accordance with this invention could readily regulate the temperature of the liquid. Similarly, a heat strip within insert 16 could maintain the pressure within container 14 by cycling on and off at predetermined set points, causing substance 24 to expand and contract accordingly. Such feature is also extremely useful in the field of balloon art for internally illuminating balloons with a light source carried within insert 16.

In another preferred embodiment of the present invention, as shown for example in FIGS. 5A and 5B, tubular insert 16 is preconfigured in a desired design 30 for internally sculpturing expandable container 14 by deforming container 14 from the inside, achieving a corresponding outward form. In general, tubular insert 16 can be preconfigured into any desired design in accordance with this invention, the only limitation being that it does not unduly stretch or stress elastic membrane 12. Such feature is particularly useful in the field of balloon art where it has endless possibilities for specific application by those of ordinary skill in the art upon practicing the present methodology.

The operation and method of the present invention will now be explained. For ease of explanation, a balloon 26 will constitute expandable container 14 and elastic membrane 12. Referring to FIGS. 1, 2A, 2B, and 2C in general, tubular insert 16 is inserted into balloon 26 so that sealing end 18 positively seats against and stretches balloon 26 at some point therein. Insert 16 need not contact balloon 26 directly opposite from where it enters but, contact may be anywhere within balloon 26. A portion of balloon 26, preferably the neck thereof, must be sealed around tubular insert 16 with, for example, collar device 34, to maintain the "stretch." In other words, balloon 26 is stretched over sealing end 18 and then sealed around tubular insert 16. It should be understood that the expandable volume of balloon 26 will depend upon where it is sealed to insert 16.

The stretching or deforming of balloon 26 by insert 16 prior to balloon 26 being pressurized is an important feature of the present invention because it is in such manner that sealing end 18 is sealed. The inherent elastic force of balloon 26, or any other elastic membranes, urges it against sealing end 18, in a sense, pulling itself down around sealing end 18. The magnitude of such elastic force (which may vary in different present embodiments) determines the strength of the seal between sealing end 18 and balloon 26; and hence, the degree to which container 14 can be inflated. Balloon 26 cannot be inflated to any greater degree than it is prestretched by tubular insert 16.

It should be further understood that any number of factors can affect the interface between sealing end 18 and balloon 26 and consequently, the degree balloon 26 can be inflated. For example, a relatively longer tubular insert 16 results in a greater degree of prestretching. Likewise, the shape of balloon 26 is a factor. Also, the thickness of balloon 26 will affect its magnitude of elastic force. A thicker balloon will not stretch as easily; however, for an equal degree of stretching as compared to a thinner walled balloon, the thicker stretched balloon forms a stronger seal against sealing end 18 and can contain far greater pressures. It also requires a greater pressure to initially unseat from sealing end 18.

Referring in particular to exemplary FIG. 2B, inflating end 20 of tubular insert 16 is connected to some external gas pressure source 22. A pressurized substance 24 travels through insert 16 and forces balloon 26 to unseat from sealing end 18. Balloon 26 will not unseat unless the pressure is greater than the elastic force holding balloon 26 against sealing end 18. This is unlikely when trying to inflate balloon 26 by mouth. In that case, it is within the scope of the present invention to unseat balloon 26 by, for example, externally pulling balloon 26 away from sealing end 18.

Upon balloon 26 being forced off of sealing end 18, pressurized gas 24 (or other substances) disperses into balloon 26 thereby inflating it. Once inflating end 20 is disconnected from external pressure supply 22 (or the supply is otherwise interrupted), balloon 26 will immediately contract until it reseats and seals sealing end 18, with any further pressurized substance 24 being forced out of balloon 26 through insert 16. This process is depicted particularly in FIG. 2C. Thus it should be apparent that balloon 26 can only be inflated with the present apparatus to the extent tubular insert 16 initially stretches balloon 26. Once the degree of such stretch from inflating equals the initial degree of stretch from insert 16, the sealing force will no longer exist (i.e., be overcome).

FIG. 3 demonstrates how connected apparatuses 10 may relate in accordance with this invention. For example, extending through appendage 28 is mated with inflating end 20 of apparatus B. Such appendage could also serve as inflating end 20 for apparatus A. When balloon 26 has multiple extending through appendages each capable of acting as an inflating end 20, those not being used as such or connected with another apparatus must be capped or sealed to the outside, as will be apparent to those of ordinary skill in the art. Any rigid or flexible coupling device will suffice for connecting apparatuses A and B, or in the alternative, the two inserts 16 may be formed as an integral component. It should be understood that there is no intended limit to the possible combination of apparatuses 10 in accordance with this invention.

When inflated through inflating end 20 of apparatus A, the gas 24 will follow the path of least resistance and travel through the coupling to balloon 26 of apparatus B. The gas will fill both inserts 16 and any appendages 18 before unseating any balloon 26 from any sealing end 18. Thus the balloons can inflate simultaneously if all other factors affecting the resistance to unseating the seals are equal. As a practical matter in such configuration, the differences in initial stretching resistances usually causes one balloon to inflate before another. Apparatus B further contains a pressure relief tube 38 to prevent over inflating either balloon 26.

FIG. 4 illustrates the principle and operation of pressure relief tube 38 and how a combination of balloons 26 may be inflated sequentially. It should be understood that pressure relief tube 38 can be structurally identical to insert 16 and either can serve the other's purpose. For example, balloon 26 could also be inflated through relief tube 38 with insert 16 serving as a pressure relief device. Such designation of such components refers only to their purpose and not necessarily their structure.

In the embodiment shown, relief tube 38 of apparatus A stretches balloon 26 more than insert 16. Thus it will require a greater pressure or expansion of balloon 26 to unseat balloon 26 from pressure end 40 of relief tube 38. Upon pressurizing the combination through inflating end 20 of apparatus A, balloon 26 will inflate until it expands enough to unseat from pressure end 40 of relief tube 38. Then, gas will flow through relief tube 38 and escape via vent end 42. Here, inflating end 20 of apparatus B is mated with vent end 42 and the relieving gas will subsequently inflate balloon 26 of apparatus B. Apparatus B contains its own relief tube 38 to which another apparatus could be mated, and continuing in like manner with further apparatuses.

Additional features may be practiced in combination with those disclosed above, including the addition of other certain features already found in the prior art. For example, present FIG. 2C represents vacuum inflator means 50 which is generally known in the art for expanding a balloon or the like received therein. The lips of the balloon in such instance are sealed at opening 52 and a vacuum motor 54 or the like is used to evacuate the remaining interior of means 50, by which the balloon is drawn outward while access to the interior thereof is provided. One advantage of using such a prior art device in further combination with the present methodology and apparatus is that the balloon is thus inflated by surrounding vacuum and can be held in an inflated state even though the balloon is open to air in the room around the container and the balloon. By reaching into such open balloon, the insertion of the present tubes (whether singular or plural) is greatly facilitated. It is especially facilitated where multiple tubes with special shapes are inserted as might be used in sculpturing a balloon. Once the vacuum inflator means 50 is used to facilitate insertion of such tubes (whether singular or plural) the remaining structure and methodology may be practiced.

The foregoing specification (particularly with reference to present FIG. 6) discloses the present concept of using materials or means within the tube insert to control temperature or pressure, or other conditions in the surrounding elastic container. It is equally possible and within the spirit and scope of the present invention to use the form and contents of the elastic container for purposes of controlling the temperature, pressure, or other conditions of the present tube inserts or of materials or items received therein. For example, contents of the surrounding elastic container might serve as insulation to maintain a constant temperature for such insert. Still further, the elastic container and its contents may serve as custom fitted packaging to protect inserts and their contents during handling, shipment, or storage thereof.

Another present variation not expressly illustrated, but which will be completely understood by those of ordinary skill in the art from the present application, is the use of a given apparatus A or B (such as in present FIGS. 3 or 4) inside further apparatuses in accordance with this invention or other apparatuses. Specifically, one apparatus A (relatively smaller than another apparatus) may be contained entirely within such other apparatus. Such use would be particularly applicable in the instance of larger versions of embodiments of the present invention, for example, as may be practiced in large scale aesthetic balloon configurations or art work. Those of ordinary skill in the art may select desired levels of pressure regulation, or select the specific light, color, and sculpturing with transparent and translucent forms of the inserts as will be understood through practice of the present invention.

Still a further variation or modification along such lines is to use one or more of the subject apparatuses (such as apparatuses A or B of present FIGS. 3 or 4) inside a container whose contents the apparatus is being used to regulate as opposed to being connected to the container externally. Such an arrangement may be used when the larger container is some container other than one of the present apparatuses.

Those of ordinary skill in the art will further appreciate that embodiments of the present invention may be used for a wide variety and range of functions other than simply in connection with aesthetic balloon configurations. For example, a pressure regulating container embodiment may accept gases, fluids, and/or expandable solids from an adjoining container when pressure in the adjoining container becomes sufficient to open the passageways otherwise sealed by the elastic membrane. In yet another device along such lines, a pressure regulating device may be provided as an embodiment to allow the elastic membrane to expel excess contents through the vessel until it shrinks sufficiently to become sealed again.

Still a further function which may be obtained through practice of the present invention relates to expanding the capacity of the subject containers 14 and making more flexible the location of such containers by making use of the foregoing pressure regulating functions, and by connecting the units in series by use of multiple vessels in single membranes.

A still further potential function relates to a self-sealing valve to allow materials to be inserted into the vessel within the membrane without releasing the contents of the membrane.

With reference to structure reshaping features of the present invention, an additional present function is to provide for structure reshaping of the elastic membrane by the shape of the vessel within the membrane for functional and/or aesthetic reasons. Still another structural reshaping feature is to reshape the elastic members by the action of inflating and releasing of contents to the membrane while the vessel is inside the membrane.

Those of ordinary skill in the art will further appreciate that specific exemplary embodiments of the present invention may be provided in kit form which may be utilized advantageously in accordance with present features. For example, one such available kit may comprise a balloon of selected shape and size, a hollow vessel (e.g., a plastic tube) of selected shape and size, and a suitable pressure fitting such as a section of vinyl hose. Optionally, a base block of plastic may be provided as a base on which to connect the assembled elements. A vessel with a ¼ of an inch inside diameter by 5/16 of an inch outside diameter with a length in a range of 20-to-25 inches is one acceptable exemplary embodiment. An example of an acceptable pressure fitting is a vinyl hose having a 5/16 of an inch inside diameter by 7/16 of an inch outside diameter, and comprising a short section of approximately ½ inch long.

By way of a specific present methodology for using the foregoing exemplary kit form of the invention, the following steps may be practiced. The tube may be inserted into the balloon, with the balloon being stretched over the full length of the tube. Thereafter, a knot may be tied in the open end of the balloon, with the knot being centered over the end of the tube. Excess balloon material below the knot may be cut off. Thereafter, the vinyl fitting may be forced over the balloon and over approximately the first 1/2 inch of the tube. Subsequently, cutting off of the knot exposes the hollow portion of the tube so that air or the like may be forced into the open end of the tube to lift the membrane off of the top end of the tube for allowing such air to fill the balloon. By removing such external air pressure, the elastic force of the membrane will squeeze out air until the membrane again closes the end of the tube. An activated chemical light or the like may be inserted into the open end of the tube to eliminated the balloon from the inside.

It will be apparent to those skilled in the art that various modifications and variations can be made in the apparatus and method of the present invention without departing from the scope and spirit of the invention. Thus it is intended that the present invention cover the modifications and variations of this invention as come within the scope of the appended claims and their equivalents.

What is claimed is:

1. A method for internally sealing an expandable elastic membrane container capable of being pressurized and maintaining substances therein in a pressurizd state, comprising the steps of:

inserting into such container a relatively rigid tubular insert having a sealing end and an inflating end so that said sealing end internally seats against and stretches said elastic membrane at some point within the container so that the elastic force of said elastic membrane seals said sealing end, while said inflating end extends from the container;

sealing the container to said tubular insert generally at a point between said inflating end and said sealing end; and connecting said inflating end to an external pressure source so that a pressurized substance travels through said tubular insert and causes the elastic membrane to unseat from said sealing end such that the pressurized substance enters into and expands the container;

wherein said tubular insert is in pressure communication with at least a second elastic membrane container and respective tubular insert thereof so that a plurality of containers may be expanded from a single external pressure source.

2. A method as in claim 1, further including the step of disconnecting the external pressure source from said inflating end so that the elastic force of the membrane reseals said sealing end.

3. A method as in claim 1, wherein the elastic membrane container comprises a balloon of predetermined size and shape.

4. A method as in claim 1, further comprising the step of internally sculpturing the expandable container by predetermining the shape of said tubular insert so that said insert internally deforms the container into a desired form.

5. A method as in claim 1, further comprising the step of inserting an illuminating device into said tubular insert for illuminating the container from its interior.

6. A method as in claim 5, wherein said illuminating device comprises an activated chemical light.

7. A method as in claim 1, further comprising the step of inserting a temperature regulation device into said tubular insert for regulating the temperature of such insert and the substance contained within the container.

8. A method as in claim 2, further comprising the step of regulating the temperature of the substance contained in the container so as to thereby regulate the temperature of said tubular insert and any contents thereof.

9. A method as in claim 2, further comprising the step of controlling the contents of the container and the conditions thereof so as to correspondingly control the conditions of said tubular insert.

10. A method as in claim 1, wherein said inserting step includes expanding the container preliminarily with a vacuum inflator received about such container, so that said tubular insert may be readily inserted and positioned in the container.

11. A method as in claim 1, wherein said tubular insert is adapted to receive goods protectively for transport or storage thereof, and wherein the container is adapted to provide a custom fitting for such insert and the goods protected therein.

12. A method as in claim 1, wherein said sealing step includes providing an interference fit length of tubing about the container relatively adjacent said tubular insert inflating end.

13. A method as in claim 1, further comprising the step of providing a pressure relief tube within the container and communicating with the exterior thereof so that pressure within the container greater than a predetermined amount is vented to the container exterior.

14. A method as in claim 1, wherein said inserting step includes inserting into the container a second relatively rigid tubular insert having at least a second sealing end internally seated against and stretching the elastic membrane at some point within such container.

15. A method as in claim 14, wherein said second tubular insert is in pressure communication with the first mentioned tubular insert so that the pressurized substance causes the elastic membrane to unseat from both respective sealing ends thereof.

16. A method as in claim 1, wherein the container includes an internally mounted reinforced sealing member, and wherein said inserting step includes aligning said tubular insert so that said sealing end thereof seats against said reinforced sealing member.

17. A method as in claim 2, further including the step of connecting said inflating end to the -vent output of a venting vessel so that the elastic membrane container functions as a reservoir of overflow discharge from the venting vessel.

18. A method for sculpturing and sealing inflatable elastic balloons, comprising the steps of:
inserting a relatively rigid tubular insert of preconfigured sculptured design, and having a respective sealing end and inflating end, into an inflatable balloon so that said sealing end internally seats against and stretches said balloon at some point therein and said sculptured design deforms such balloon from within, such that said sealing end is sealed by the elastic force of the stretched balloon, and said inflating end extends from the neck of the balloon;
sealing the balloon to said tubular insert generally at the point where said inflating end extends from the balloon;
connecting said inflating end to an external pressurized gas source so that pressurized gas travels through said tubular insert to cause the balloon to become unseated from said sealing end allowing the pressurized gas to disperse into and inflate the balloon; and
interrupting the flow of pressurized gas to said inflating end so that the balloon is resealed at said sealing end, such that the remaining structure is an inflated balloon that is internally sculptured by said tubular insert deforming such balloon from the inside; and
further comprising the step of inserting a light source within said tubular insert for illuminating such balloon from the inside.

19. A method for sculpturing and sealing inflatable elastic balloons, comprising the steps of:
inserting a relatively rigid tubular insert of preconfigured sculptured design, and having a respective sealing end and inflating end, into an inflatable balloon so that said sealing end internally seats against and stretches said balloon at some point therein and said sculptured design deforms such balloon from within, such that said sealing end is sealed by the elastic force of the stretched balloon, and said inflating end extends from the neck of the balloon;
sealing the balloon to said tubular insert generally at the point where said inflating end extends from the balloon;
connecting said inflating end to an external pressurized gas source so that pressurized gas travels through said tubular insert to cause the balloon to become unseated from said sealing end allowing the pressurized gas to disperse into and inflate the balloon;
interrupting the flow of pressurized gas to said inflating end so that the balloon is resealed at said sealing end, such that the remaining structure is an inflated balloon that is internally sculptured by said tubular insert deforming such balloon from the inside; and
providing a plurality of tubular inserts in a corresponding respective plurality of elastic inflatable balloons, such tubular inserts being connected in series gas pressure communication for respective inflation of such ballons.

20. A method as in claim 19, wherein said sealing step includes exteriorly clamping the balloon about said tubular insert relatively adjacent said inflating end thereof.

21. A method of fabricating an aesthetic balloon creation, comprising:
   providing a plastic tube with first and second ends, an elastic balloon, and a short section of a tubular fitting;
   inserting the first end of the tube into the balloon and stretching the balloon over the length of the tube generally to the second end thereof;
   temporarily securing the stretched balloon at the tube second end;
   applying the tubular fitting to the tube second end and about the stretched balloon so as to secure and seal the stretched balloon thereat;
   forcing a fluid into the tube second end so as to fill the balloon to a desired amount; and
   interrupting the flow of forced fluid to the tube second end so that the elastic force of the stretched balloon seals the flow of fluid at the tube first end.

22. A method as in claim 21 wherein said forcing step includes first drawing the stretched balloon away from the tube first end so as to permit unblocked fluid flow therefrom into the balloon.

23. A method as in claim 22, wherein said forcing step includes user manipulation of the balloon exterior so as to first separate the tube first end from a portion of the stretched balloon otherwise sealed thereagainst.

24. A method as in claim 22, wherein said forcing step includes drawing a vacuum about the stretched balloon so as to first separate the tube first end from a portion of the stretched balloon otherwise sealed thereagainst.

25. A method as in claim 21, wherein said temporarily securing step includes tieing a knot in the open end of the stretched balloon, centering such knot over the tube second end, and trimming excess portions of the stretched balloon extending beyond such knot.

26. A method as in claim 21, further including the step of inserting an activated chemical light into the tube through the second end thereof so as to illuminate the balloon from its interior.

27. A method as in claim 21, further including providing a plurality of such fluid filled balloons operatively interconnected in a series arrangement.

28. A method as in claim 21, wherein said providing step includes preselecting the shape of the plastic tube so that the balloon when in its fluid filled condition will assume a desired configuration.

29. Balloon apparatus, comprising:
   at least one elastic membrane expandable container capable of being pressurized and maintaining substances carried therein in a pressurized state;
   a relatively rigid tubular insert having a sealing end and an inflating end, said insert extending into said expandable container an adequate distance so that said sealing end internally seats against and stretches said elastic membrane at some point within said container so that the elastic force of the stretched elastic membrane seals said sealing end, while said inflating end extends from said expandable container;
   means for sealing said expandable container around said tubular insert generally at a point between said inflating end and said sealing end, so that upon connecting said inflating end to an external pressure source, a pressurized substance travels through said tubular element and causes the elastic membrane to unseat from said sealing end such that the pressurized substance enters into and expands said container, and upon disconnecting such external pressure source the elastic force of the membrane reseals said sealing end and;
   at least one additional elastic membrane expandable container combined with a tubular insert and means for sealing with the inflating end of such additional container connected to said inflating end of the first mentioned container so that such containers may be pressurized from a commonly shared external pressure source.

30. Apparatus as in claim 29, wherein said at least one expandable container is capable of being pressurized with one of gases, liquids, and fine particulate substances having fluid mass properties.

31. Apparatus as in claim 29, wherein said at least one expandable container comprises a balloon of predetermined size and shape, and said tubular insert is preconfigured in a selected design for internally sculpturing said at least one expandable container by deforming said at least one expandable container from within into the selected design.

32. Apparatus as in claim 29, wherein said tubular insert is generally transparent, and wherein said apparatus further includes a light source carried within said tubular insert for illuminating said at least one expandable container from the inside.

33. Apparatus as in claim 32, wherein said light source comprises an activated chemical light.

34. Apparatus as in claim 29, further including control means carried within said tubular insert for controlling the temperature and/or pressure of the pressurized substance within said at least one expandable container.

35. Apparatus as in claim 29, wherein said sealing means comprises a collar device for fitting over said tubular insert and for sealing a portion of the elastic membrane between said tubular insert and said collar device generally near said inflating end so as to seal the elastic membrane around said tubular insert.

36. Apparatus as in claim 29, further including vacuum inflator means surrounding the elastic membrane for externally drawing the membrane away from said tubular end sealing end to facilitate pressurizing of said at least one expandable container with a relatively low pressure source which otherwise would not be sufficient to unseat said at least one elastic membrane from said sealing end, with the elastic force of such membrane resealing said sealing end upon deactuation of said vacuum inflator means.

37. Apparatus as in claim 29, further comprising a pressure relief tube having a pressure end extending into said at least one expandable container seating against the elastic membrane and sealed thereby with a greater elastic force than that sealing said tubular insert sealing end, said pressure relief tube having a vent end extending out of said at least one expandable container with the container sealed therearound, so that upon pressurization the elastic membrane will unseat first from said tubular insert sealing end allowing said at least one expandable container to inflate to a maximum limit where the elastic membrane unseats from said pressure relief tube pressure end, thereby allowing the pressurized substance to flow into said overpressure tube and exit said at least one expandable container via said vent end until the pressure in such expandable container reduces to a point that the elastic force of the membrane reseals said overpressure tube pressure end.

38. Apparatus as in claim 29, wherein said tubular insert comprises a plurality of appendages each having at least one sealing end contacting and sealing internally with the elastic membrane.

39. Apparatus as in claim 29, further including a reinforced sealing member carried on said at least one interior of the container and positioned so as to sealingly engage said tubular insert sealing end.

40. Balloon apparatus for internally sealing and sculpturing balloons, comprising:

a first inflatable balloon;

a relatively rigid tubular insert of preconfigured sculptured design having a respective sealing end and inflating end, said tubular insert extending into said first inflatable balloon so that said sealing end internally seats against and stretches the balloon at some point therein while said tubular insert sculptured design deforms such balloon from within, such that said sealing end is sealed by the elastic force of the stretched balloon, with said inflating end extending from the neck of the balloon;

means for sealing the balloon around said tubular insert generally at the point where said inflating end extends from the balloon so that upon inflation of the balloon by connecting said inflating end to an external pressurized gas source, pressurized gas travels through said tubular insert causing the balloon to become unseated from said sealing end allowing the pressurized gas to disperse into and inflate the balloon, and so that upon interrupting the flow of pressurized gas to said inflating end the balloon is resealed at said sealing end, such that the remaining structure comprises an inflated balloon that is internally sculptured by said tubular insert deforming such balloon from within; and further including a plurality of such tubular inserts received in a corresponding plurality of inflatable balloons and respectively sealed in combination therewith by a corresponding plurality of means for sealing, such plurality of combinations being arranged in a user-defined configuration of parallel and/or series pressurized gas connections.

41. Apparatus as in claim 40, wherein said tubular insert is generally transparent, and said apparatus further comprises a light source carried within said tubular insert for illuminating said first balloon from the inside.

42. Apparatus as in claim 40, wherein said means for sealing comprises a collar device fitting over said tubular insert generally at the point where said inflating end extends from said first balloon and sealing a portion of such balloon between said tubular insert and said collar device.

43. An aesthetic balloon configuration, comprising:

an elastic balloon;

a hollow -tube with first and second ends in respective fluid communication with the hollow interior of such tube, such tube being at least partially received within said elastic balloon such that said tube first end is within said balloon while said tube second end is without; and a short section of tubular fitting- received about said tube relatively adjacent said second end thereof with said balloon stretched down thereto an adequate distance such that said tube first end is sealed by the elastic force of said balloon drawing the interior of said balloon into sealing contact with said tube first end while the stretched balloon is sealed between said tube and said tubular fitting, so that introduction of fluid into said tube second end pressurized to an extent greater than said balloon elastic force will unseal said tube first end to permit fluid to enter said balloon through said tube, while removal of such pressure at said tube second end will permit said balloon elastic force to reseal said tube first end and capture fluid previously introduced into said balloon.

44. An aesthetic balloon configuration as in claim 43, wherein said hollow tube is preconfigured in a desired shape so as to internally impart a corresponding desired shape to the balloon stretched thereover.

45. An aesthetic balloon configuration as in claim 43, further including a light source inserted into said hollow tube for illuminating said balloon from the interior thereof.

46. An aesthetic balloon configuration as in claim 43, further including a plurality of respectively combined balloons, tubes, and tubular fittings, collectively combined in selected parallel and/or series fluid connections for obtaining a user-desired overall aesthetic configuration.

* * * * *

UNITED STATES PATENT AND TRADEMARK OFFICE
CERTIFICATE OF CORRECTION

PATENT NO. : 5,141,463

DATED : August 25, 1992

INVENTOR(S) : ROUSE, JR.

It is certified that error appears in the above-identified patent and that said Letters Patent is hereby corrected as shown below:

Column 12, line 40:
Claim 1, line 3, change "pressurizd" to --pressurized--.

Signed and Sealed this

Fifteenth Day of March, 1994

Attest:

BRUCE LEHMAN

Attesting Officer — Commissioner of Patents and Trademarks